May 19, 1942.  A. FRESE  2,283,248
THERMOMETER HOLDER
Filed May 6, 1940
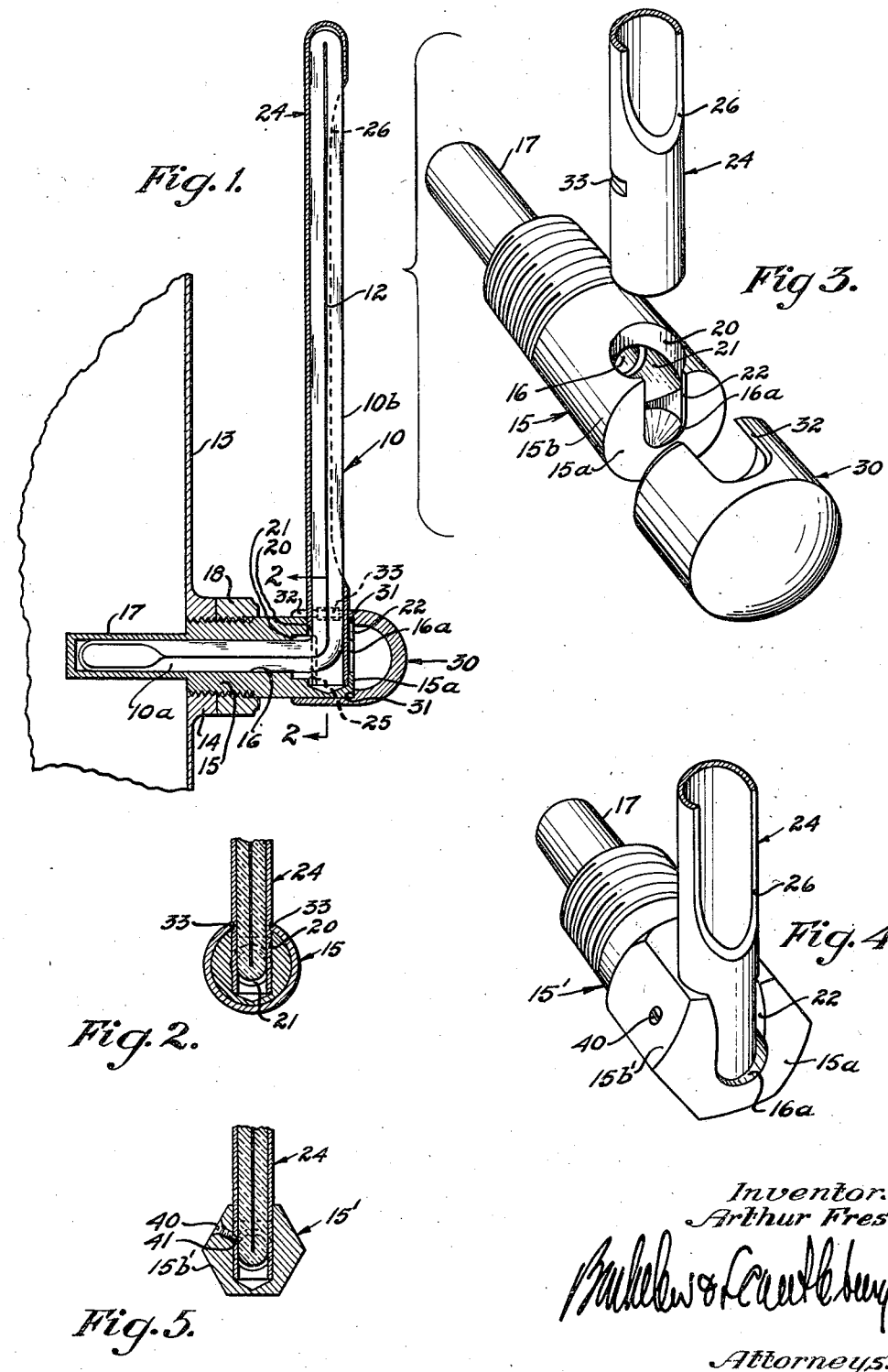
Inventor.
Arthur Frese.
Attorneys.

Patented May 19, 1942

2,283,248

UNITED STATES PATENT OFFICE 2,283,248

THERMOMETER HOLDER

Arthur Frese, Santa Monica, Calif., assignor to Adolph Frese Corporation, Los Angeles, Calif., a corporation of California Application May 6, 1940, Serial No. 333,607

6 Claims. (Cl. 73—375)

This invention relates generally to thermometer holders, and more particularly to holders for insertion thermometers.

Insertion thermometers will be understood as those arranged to be inserted through the side of a container whose interior temperature is to be measured, the thermometer projecting out through a suitable holder and being readable from a position outside the container. It is common to bend the thermometer into a right-angle form, so that one leg of the thermometer extends horizontally through the side of the container, while the other leg extends in an upright position for convenient observation.

A general object of the present invention is to provide improved holding means for an insertion thermometer of the angle type, characterized by simplicity of construction, substantial support and protection for all parts of the thermometer, and capability of assembly and disassembly with the utmost facility and convenience.

A still further object is the provision of a thermometer holder of the class mentioned which may be disassembled and reassembled to replace the thermometer by very simple and quickly performed manual operations.

The invention itself will be most readily understood from the following detailed description of present preferred embodiments thereof, reference for this purpose being had to the accompanying drawing, in which:

Fig. 1 is a longitudinal medial section through the thermometer holder of the present invention installed in position in the side of a container, the interior temperature of which is to be measured;

Fig. 2 is a detail section taken on line 2—2 of Fig. 1;

Fig. 3 is a disassembled perspective showing certain parts of the invention;

Fig. 4 is a perspective showing a modification; and

Fig. 5 is a transverse section of the form of Fig. 4, showing a securing means for the thermometer protecting tube.

In Figs. 1 to 3 of the drawing, numeral 10 designates an angle type thermometer having legs 10a and 10b, the former being the "insertion" leg, while the leg 10b is exposed to view so that the height of the mercury column 12 can be conveniently read. Numeral 13 designates the side of the container within which leg 10a is inserted, being illustrated as having a boss 14 within which is threaded the tubular body 15 of the holder. This body 15 is formed with longitudinal, axial or central bore 16 which is adapted to slidably receive the leg 10a of thermometer 10. The inner end of body 15 has a reduced and relatively thin walled extension 17 which projects inside container wall 13, the bore 16 and thermometer leg 10a extending inside this extension portion 17 as illustrated. A lock nut 18 on the threaded portion of the body 15 is set up against boss 14 to secure body 15 tightly in position.

A lateral or right-angle bore 20, of a diameter somewhat larger than that of bore 16, is drilled through the side of body 15 to and preferably just slightly beyond bore 16, and the thermometer when in position extends co-axially through bore 20 and then into bore 16 as illustrated. Bore 16 is enlarged somewhat for a short distance inwardly of its juncture with bore 20, as indicated at 21, so as to avoid possible interference between the angle of the thermometer and body 15 at the juncture of bores 20 and 16. Bore 16 extends through the outer end 15a of body 15, as indicated at 16a, and a notch 22, of a width equal to the diameter of bore 16, connects opening 16a with bore 20. This structure enables the thermometer to be readily inserted in the body 15, its leg 10a entering via 16a, and its leg 10b being inserted into bore 20 via notch 22. The thermometer having thus been inserted, a protecting tube 24 is slipped on over leg 10b, its end portion being inserted inside bore 20 to the position illustrated in Fig. 1. This tube 24 has a notch 25 which receives and passes thermometer leg 10a. Thus, tube 24 is inserted to such a position that it covers over or encloses opening 16a and notch 22, its notch 25 at the same time facing inwardly so as to pass thermometer leg 10a. A slot 26 in the side of tube 24 exposes the usual thermometer scale (not illustrated) and the mercury column.

The protecting tube 24 being in position, it is secured tightly to body 15 by suitable securing means, a preferred form of which, in accordance with the present invention, appears in Figs. 1 to 3. As there shown, a cap 30 is provided adapted to slide on over the rounded end portion 15b of body 15, a positioning shoulder 31 formed inside cap 30 engaging the outer end 15a of body 15 when the cap is fully home in locking position. Cap 30 is provided with a notch 32 which receives tube 24 as it slides into locking position, this notch 32 being slightly less in width than the diameter of tube 24, and the latter having notches 33 formed in its sides in which are received the edges defining the notch 32 as the cap is moved on over the end of body 15. This engagement between cap 30 and notches 33 in tube 24 serves two purposes, first, to lock tube 24 against separation from body 15, and second, to support tube 24 against rotation. Cap 30 is provided with a comparatively snug sliding fit on the end portion of body 15, and serves as a simple and easily manipulated locking device for locking the assembly in position. If at any time the unit is to be disassembled for any purpose, such as for the purpose of replacing the thermometer, this is done without the necessity for use of tools of any kind, it only requiring that cap 30 be pulled off with the fingers, after which the tube 24 is simply lifted out of position and the thermometer then withdrawn. At the same time, the thermometer is given effective protection against breakage while in service.

Figs. 4 and 5 show a modification. The device in this case may be considered as similar to that of Figs. 1 to 3, excepting for the means for securing tube 24 in position. The securing means in this instance consists simply of a set screw 40 threaded into the side of the end portion 15b' of body 15' (in this instance shown as hexagonal), said set screw 40 engaging in a socket 41 in the end portion of tube 24 as illustrated.

It will be understood that while I have here shown and described certain present preferred embodiments of my invention, these are for illustrative purposes only, and various changes in design, structure and arrangement may be made without departing from the spirit and scope of the invention or of the appended claims.

I claim:

1. A holder for an angle thermometer, comprising a body adapted to be mounted in a wall of a chamber and having a portion extending outwardly from said chamber and terminating in an outer end, said body having a central bore opening through its outer end and adapted to receive one leg of the thermometer, a lateral bore of a diameter greater than that of the central bore opening through one side of said body near its said outer end and communicating with said central bore, said lateral bore being adapted to receive the other leg of the thermometer, a notch in the outer end portion of said body connecting the opening of said central bore in the outer end of said body with said lateral bore, said notch being adapted to pass the second mentioned thermometer leg when the first mentioned thermometer leg is inserted in the central body bore, a protecting tube adapted to surround said second mentioned thermometer leg and having an end portion slidably receivable within said lateral bore, said end portion closing said notch in the outer end portion of said body, and a cap slidably fitted on the outer end portion of said body, said cap having a notch adapted to receive said protecting tube, and said protecting tube having a groove engaged by a portion of said cap defining said notch, whereby said tube is secured against separation from said body.

2. A holder for an angle thermometer, comprising a body adapted to be mounted in a wall of a chamber and having a portion extending outwardly from said chamber and terminating in an outer end, said body having a central bore opening through its outer end and adapted to receive one leg of the thermometer, a lateral bore opening through one side of said body near its said outer end and communicating with said central bore, said lateral bore being adapted to receive the other leg of the thermometer, a notch in the outer end portion of said body, of a width at least as great as the diameter of the thermometer, connecting said lateral bore with the portion of said central bore that is located outwardly of said lateral bore, said notch being adapted to pass the second mentioned thermometer leg when the first mentioned thermometer leg is inserted in the central body bore, a protecting tube adapted to surround said second mentioned thermometer leg and having an end portion slidably receivable within said lateral bore, and a cap slidably fitted on the outer end portion of said body, said cap having a notch in one of its sides adapted to receive said protecting tube, the width of said notch being slightly less than the diameter of said tube, and said tube having notches in opposite sides engaged by the edge portions of said cap defining said notch, whereby said tube is secured against both rotation and separation relatively to said cap.

3. A holder for an angle thermometer, comprising a body adapted to be mounted in a wall of a chamber and having a portion extending outwardly from said chamber and terminating in an outer end, said body having a central bore opening through its said outer end and adapted to receive one leg of the thermometer, a lateral bore opening through a side of said body near its said outer end and communicating with said central bore, said lateral bore being adapted to receive the other leg of said thermometer with clearance, a notch in the outer end portion of said body connecting the opening of said central bore in the outer end of said body with said lateral bore, said notch being adapted to pass the second mentioned thermometer leg when the first mentioned thermometer leg is inserted in the central body bore, and a protecting tube adapted to surround said second mentioned thermometer leg and having an end portion slidably receivable within said lateral bore and extending across said central bore, said end portion of said tube having a notch adapted to pass said first mentioned leg of said thermometer.

4. A holder for an angle thermometer, comprising a body adapted to be mounted in a wall of a chamber and having a portion extending outwardly from said chamber and terminating in an outer end, said body having a central bore opening through its said outer end and adapted to receive one leg of the thermometer, a lateral bore opening through a side of said body near its said outer end and communicating with said central bore, said lateral bore being adapted to receive the other leg of said thermometer with clearance, a notch in the outer end portion of said body connecting the opening of said central bore in the outer end of said body with said lateral bore, said notch being adapted to pass the second mentioned thermometer leg when the first mentioned thermometer leg is inserted in the central body bore, a protecting tube adapted to surround said second mentioned thermometer leg and having an end portion slidably receivable within said lateral bore and extending across said central bore, said end portion of said tube having a notch adapted to pass said first mentioned leg of said thermometer, and a cap slidably fitted on the outer end portion of said body and engageable with said tube, said cap and tube having interengaging locking formations adapted to secure the tube against movement with reference to the body.

5. A holder for an angle thermometer, comprising a body adapted to be mounted in a wall of a chamber and having a portion extending outwardly from said chamber and terminating in an outer end, said body formed with a central bore having an opening through the outer end of the body and adapted to receive one leg of the thermometer, a lateral bore opening through a side of said body near its said outer end and communicating with said central bore, said lateral bore being adapted to receive the other leg of said thermometer with clearance, a notch in the outer end portion of said body connecting the opening of said central bore in the outer end of said body with said lateral bore, said notch being adapted to pass the second mentioned thermometer leg when the first mentioned thermometer leg is inserted in the central body bore, a protecting tube adapted to surround said second mentioned thermometer leg and having an end portion slidably receivable within said lateral bore, and a cap slidably fitted on the outer end portion of said body and engageable with said tube, said cap and tube having interengaging locking formations adapted to secure the tube against movement with reference to said body.

6. A holder for an angle thermometer, comprising a body adapted to be mounted in a wall of a chamber and having a portion extending outwardly from said chamber and terminating in an outer end, said body formed with a central bore having an opening through the outer end of the body and adapted to receive one leg of the thermometer, a lateral bore opening through a side of said body near its said outer end and communicating with said central bore, said lateral bore being adapted to receive the other leg of said thermometer with clearance, a notch in the outer end portion of said body connecting the opening of said central bore in the outer end of said body with said lateral bore, said notch being adapted to pass the second mentioned thermometer leg when the first mentioned thermometer leg is inserted in the central body bore, a protecting tube adapted to surround said second mentioned thermometer leg and having an end portion slidably receivable within said lateral bore, and a cap slidably fitted on the outer end portion of said body, said cap having a notch adapted to receive said protecting tube, and said protecting tube having a shoulder engaged by a portion of said cap defining said notch, whereby the tube is secured against separation from the body.

ARTHUR FRESE.